United States Patent [19]

Ueno

[11] Patent Number: 5,779,139
[45] Date of Patent: Jul. 14, 1998

[54] AUTOMATIC WATER COMBINATION FAUCET

[75] Inventor: Yuseki Ueno, Tokyo, Japan

[73] Assignee: NTC Kogyo Kabushiki Kaisha, Tokyo, Japan

[21] Appl. No.: 770,001

[22] Filed: Dec. 19, 1996

[30] Foreign Application Priority Data

Dec. 20, 1995 [JP] Japan ................................. 7-349333

[51] Int. Cl.⁶ .................................................... G05D 23/13
[52] U.S. Cl. ........................................ 236/12.2; 236/12.22
[58] Field of Search ....................... 236/12.2, 12.21, 236/12.22

[56] References Cited

U.S. PATENT DOCUMENTS

| | | | |
|---|---|---|---|
| 5,025,983 | 6/1991 | Akita | 236/12.2 |
| 5,340,018 | 8/1994 | MacDonald | 236/12.2 |
| 5,344,067 | 9/1994 | Axelsson et al. | 236/12.2 |
| 5,370,305 | 12/1994 | Schneider | 236/12.2 |

*Primary Examiner*—William E. Tapolcai
*Attorney, Agent, or Firm*—Browdy and Neimark

[57] ABSTRACT

A mixing valve mechanism and a thermostat respectively incorporated in a body are housed in a cartridge of an axial cylinder shape, and the cartridge is inserted into the body so as to be freely rotated around a rotary axis in the longitudinal axial direction. An adjustment screw is provided on one end of the body, i.e., on the side opposite to a projected or retracted operating rod of the thermostat in the cartridge so as to be freely displaced in the axial direction of the body to support the operating rod. The adjustment screw and one end of the cartridge and the adjustment screw and the body are respectively connected together through a screw or a spline such that the adjustment screw is displaced in the axial direction of the body through the rotation of the cartridge. The cartridge is connected to a temperature control dial provided on the other end of the body so as to be rotated by the operation of rotating the temperature control dial.

3 Claims, 5 Drawing Sheets

AUTOMATIC WATER COMBINATION FAUCET

BACKGROUND OF THE INVENTION

1. Field of the Invention

This invention relates to a water combination faucet used to discharge combination water from a combination water outlet, provided in a body, as hot water at a desired temperature resulting from mixing hot water, heated in a boiler or like water heater and then supplied into the body through a hot water supply line, with water, supplied from a supply water faucet or a water tank into the body through a water supply line, in a desired ratio, and more particularly to an improved automatic water combination faucet having a body, a thermostat incorporated in the body to automatically control the temperature of discharged hot water to a set temperature, and a temperature control dial incorporated with one end of the body to variably control the setting temperature of discharged hot water.

2. Description of the Prior Art

As shown in FIG. 1, in an automatic water combination faucet A having the thermostat incorporated in the body as described above, a temperature control dial D is generally incorporated with the right end of the body 1 to variably control the setting temperature of discharged hot water as desired.

The reason why the temperature control dial D is incorporated with the right end of the body 1 is as follows. Namely, in case where a piping work in a bathroom or like places installed with the automatic water combination faucet A is preliminarily made such that a connection end of a hot water supply line W for leading hot water and that of a water supply line Y for leading water are arranged in parallel to each other on the left and right sides of the automatic water combination faucet A, the arrangement of these lines is for meeting a prescription that the piping work should be made such that the hot water supply line W is on the left side and the water supply line Y is on the right side. Further, as shown in FIG. 1, when a thermostat TH housed in a cartridge 2 is incorporated in the body 1 suitably to the positions of the hot water supply line W and the water supply line Y which are arranged so as to meet the above prescription, an operating rod a is projected toward the right. In this state, an adjustment screw b is positioned on the right end side of the body 1 since the adjustment screw b supports the projection end of the operating rod a and is moved in the direction of projection or retraction of the operating rod a. Consequently, the temperature control dial D for operating the adjustment screw b is incorporated with the right end of the body 1.

Incidentally, in some cases, the automatic water combination faucet A as one of water combination faucets with the thermostat has the following structure. Namely, the temperature control dial D is incorporated with one end of the body 1, and a stop handle E is incorporated with the other end of the body 1 to perform on-off control of discharged combination water.

In case of using hot water discharged as combination water from the automatic water combination faucet having the above structure, the temperature control dial D is operated only once to set the temperature of discharged hot water. However, the stop handle E is repeatedly operated to perform on-off control of discharged hot water until the use of hot water is finished.

In this connection, the automatic water combination faucet A requires the following structure. Namely, the highly-operated stop handle E is positioned on the right side convenient to use, and the less frequently-operated temperature control dial D is positioned on the left side.

However, the automatic water combination faucet A generally has a hot water inlet pipe 10 provided on the left end side of the body 1 and a water inlet pipe 11 provided on the right end side of the body 1 in correspondence to the hot water supply line W and the water supply line Y which are arranged as described above. Thus, in order to simplify a passage for leading hot water from the hot water inlet pipe 10, the thermostat TH is incorporated in the body 1 such that a therms sensor connected to a mixing valve mechanism is positioned on the left side and the projected or retracted operating rod a is positioned on the right side. By so doing, the adjustment screw b is positioned on the right side to support the operating rod a, and as a result, the temperature control dial D is positioned on the right side. Consequently, this fact puts restrictions on that the temperature control dial D is not allowed to be positioned on the left side.

In order to release from the above restrictions so as to attain an automatic water combination faucet A having a temperature control dial D positioned on the left side, the present applicant has developed and applied a means to allow the temperature control dial D to be incorporated with the left end, as described in Japanese Patent Application No. Hei 6-335823. According to the developed means, as shown in FIG. 2, a passage having a double-wall structure is defined in the body 1 such that an outer passage serves as a passage to lead water from the water inlet pipe 11, and an inner passage serves as a passage to lead hot water from the hot water inlet pipe 10. In the structure, the hot water passage is arranged to lead hot water once to the right end side in the body 1. Further, the thermostat TH is incorporated in the body 1 such that the therms sensor is positioned on the right side and the operating rod a is projected toward the left. Furthermore, the adjustment screw b is positioned on the left end to thereby allow the temperature control dial D to be incorporated with the left end.

However, the means developed by the present applicant to allow the temperature control dial D to be incorporated with the left side has the following problems. Namely, a first problem encountered in the above means is that a cumbersome process fabrication is required, since the hot water passage and the water passage are defined in the body 1 to have the double-wall structure composed of the inner and outer passages in order that the thermostat TH is incorporated in the body 1 such that the projected or retracted operating rod a of the thermostat TH is projected toward the left. A second problem encountered in the above means is that the combination water passage is complicated to require a troublesome process fabrication, since hot water and water led to the right end side of the body 1 are caused to lead backward to the left so as to provide combination water, and the resultant combination water is then caused to lead backward from the left to the right again. A third problem encountered in the above means is that it is cumbersome to connect another casing C to the right end of the body 1, since a stop valve mechanism should be formed to cause on-off control of discharged combination water and a passage should be also formed to discharge combination water controlled by the stop valve mechanism, as shown in FIG. 2, when the stop handle E is incorporated with the right end of the body 1.

Among the above problems, the third problem requiring the connection of the separately-formed casing C is dissolved by using a means to mount a partition wall B on the right end side in the body 1, as shown in FIG. 3. However, the first and second problems are not dissolved by the above means, and still await solution.

SUMMARY OF THE INVENTION

The prevent invention is made to completely overcome the above problems, and it is an object of the present invention to provide novel means having the following structure. Namely, an adjustment screw is provided on one end side in a body, i.e., on the side of an operating rod of a thermostat incorporated in the body such as to cause a displacement of a position to support the operating rod, and a temperature control dial is incorporated with the other end of the body, whereby the position to support the operating rod is freely varied by the temperature control dial to release from the positional restrictions that the adjustment screw and the temperature control dial should be positioned to be adjacent to each other. Further, the thermostat is incorporated in the body such that the operating rod is projected to the right to thereby simplify the structure of passages to lead hot water, water and combination water, while the temperature control dial is incorporated with the left end of the body, whereby the dial is operated to enable the operation of the adjustment screw to support the operating rod.

According to the present invention, as a first means for attaining the above object, there is provided an automatic water combination faucet comprising a body having a hot water inlet pipe, a water inlet pipe and a combination water outlet pipe respectively provided on the outer surface, a mixing valve mechanism incorporated in the body to control the rate of inflow of hot water and water respectively supplied from the hot water inlet pipe and the water inlet pipe, and a thermostat incorporated in the body to automatically control the mixing valve mechanism so as to hold a desired setting temperature of combination water discharged from the combination water outlet pipe. In the above structure, the mixing valve mechanism and the thermostat are incorporated in the body so as to be housed in a cartridge of an axial cylinder shape, and the cartridge is inserted into the body and is freely rotated about a rotary axis in the longitudinal axial direction. Further, an adjustment screw is provided on one end side in the body, i.e., on the side of a projected or retracted operating rod of the thermostat in the cartridge and is freely displaced in the axial direction of the body so as to support the operating rod. Furthermore, the adjustment screw and one end of the cartridge and the adjustment screw and the body are respectively connected together through a screw or a spline such that the adjustment screw is displaced in the axial direction of the body through the rotation of the cartridge, and the cartridge is connected with the temperature control dial provided on the other end of the body and is rotated by the operation of rotating the temperature control dial. As a second means, there is simultaneously provided an automatic water combination faucet comprising a body having a hot water inlet pipe provided at a position close to the left of the body and connected with a hot water supply line, a water inlet pipe provided at a position close to the right of the body and connected with a water supply line and a combination water outlet pipe provided at a desired position of the body, a cartridge containing a mixing valve mechanism and a thermostat and incorporated in the body so as to be freely rotated about a longitudinal axis of the cartridge in such a state that an operating rod of the thermostat is positioned on the right end. In the above structure, the cartridge is connected with a temperature control dial incorporated with the left end of the body and is rotated by the operation of rotating the dial, and an adjustment screw is arranged on the right end side in the body to support the operating rod of the thermostat. The adjustment screw is connected with the cartridge so as to be displaced in the direction of projection or retraction of the operating rod through the rotation of the cartridge.

According to the first means of the present invention having the above structure, when the temperature control dial incorporated with either of the left and right ends of the body is rotated, the cartridge incorporated in the body and containing the mixing valve mechanism and the thermostat is rotated. Then, the adjustment screw provided on the end in the body, i.e., on the side opposite to the temperature control dial is displaced in the axial direction of the body to control the setting temperature as desired.

According to the second means of the present invention, when the temperature control dial incorporated with the left end of the body is operated for rotation, the cartridge incorporated in the body and containing the thermostat and the mixing valve mechanism is rotated to displace the adjustment screw incorporated with the right end of the body in the axial direction of the body. As a result, the position of the adjustment screw to support the operating rod of the thermostat is displaced in the direction of projection or retraction of the operating rod to control the setting temperature as desired. Further, the hot water inlet pipe, the water inlet pipe, and the passages defined in the body to lead hot water, water and combination water are allowed to have simple shapes suitable to the hot water supply line positioned on the left side and the water supply line positioned on the right side.

Further, in case where a stop handle is incorporated with the right end of the body, the stop handle and a lid member which closes the right end of the body are allowed to be simply connected together by water-tightly connecting a valve shaft of a stop valve mechanism and the lid member together by means of screwing.

As has been described above, according to the present invention, when the temperature control dial incorporated with the end of the body is operated for rotation, the rotation of the temperature control dial is transmitted through the cartridge in the body to the adjustment screw provided on the end in the body, i.e., on the side opposite to the temperature control dial. Thus, the adjustment screw is displaced in the axial direction of the body, and therefore, it is possible to release from the restrictions that the temperature control dial and the adjustment screw should be incorporated to the body to be adjacent to each other. Further, even if the temperature control dial is incorporated with either of the left and right ends of the body, the adjustment screw is allowed to be arranged on the end opposite to the temperature control dial.

Further, according to the second means of the present invention, the hot water inlet pipe and the water inlet pipe respectively provided in the body as well as the passages defined in the body to lead hot water and water from the hot water inlet pipe and the water inlet pipe are allowed to have simple shapes suitable to the hot water supply line positioned on the left side and the water supply line positioned on the right side.

Furthermore, in case where the stop handle is incorporated with the right end of the body, the stop handle and the valve shaft of the stop valve mechanism incorporated in a hollow space defined on the right end side in the body are allowed to be simply connected together by connecting the valve shaft and the lid member, which closes the right end of the body, together by means of screwing.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
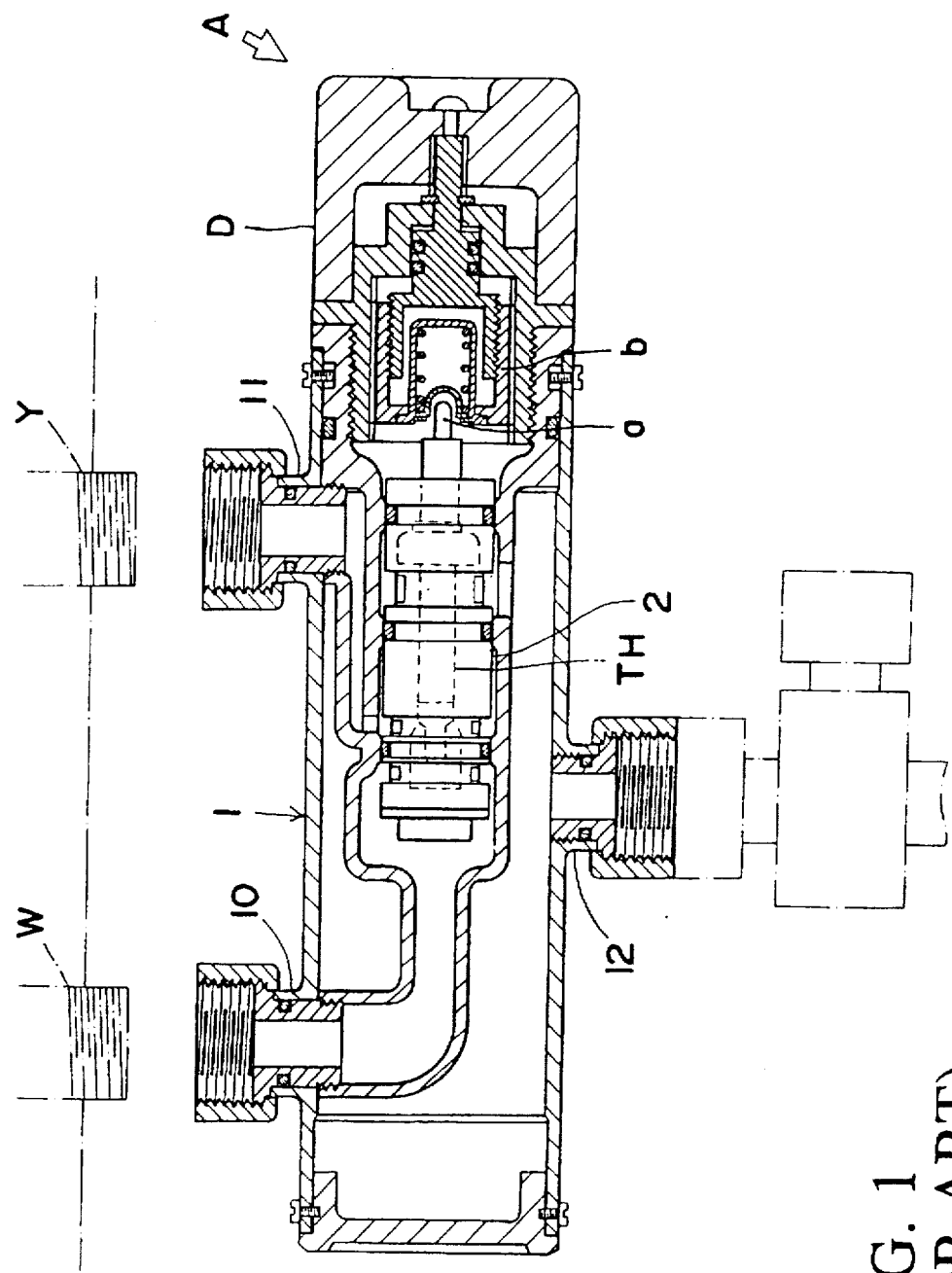
FIG. 1 is a longitudinal sectional front view showing a general type of a conventional automatic water combination faucet having a temperature control dial incorporated with the right side.
Figure 2:
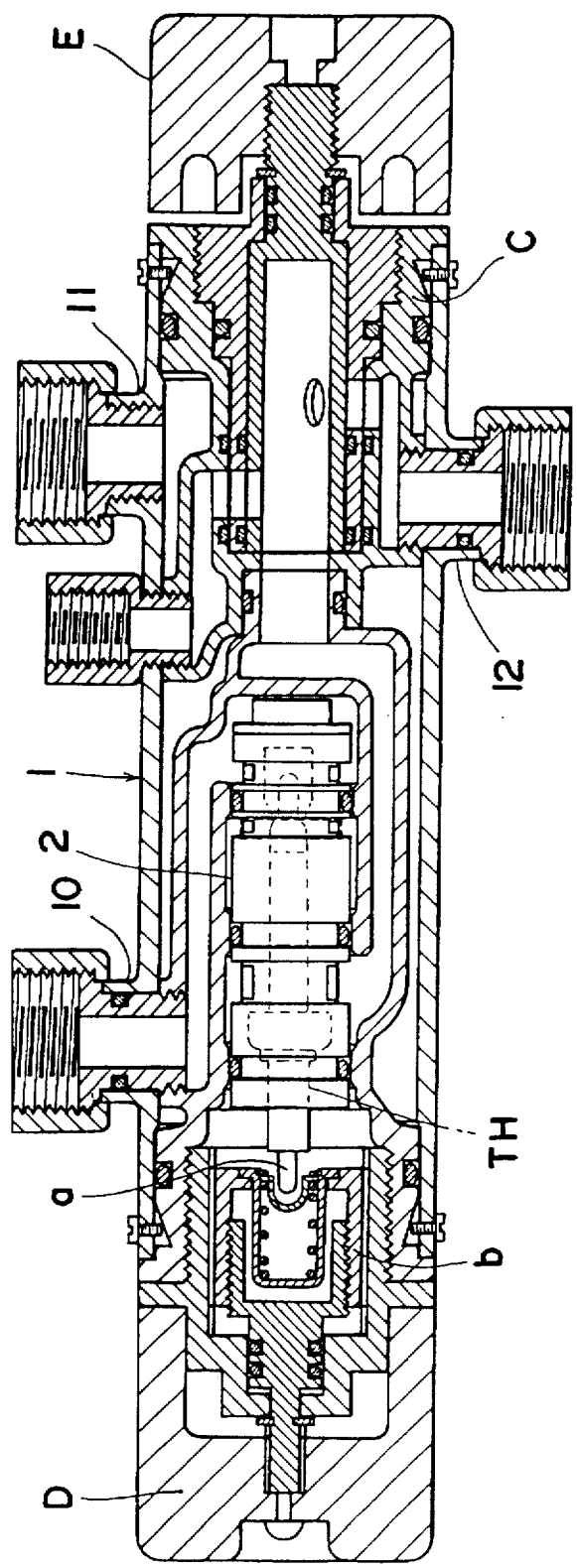
FIG. 2 is a longitudinal sectional front view showing another type of a conventional automatic water combination faucet having a temperature control dial incorporated with the left side and a stop handle incorporated with the right side.
Figure 3:
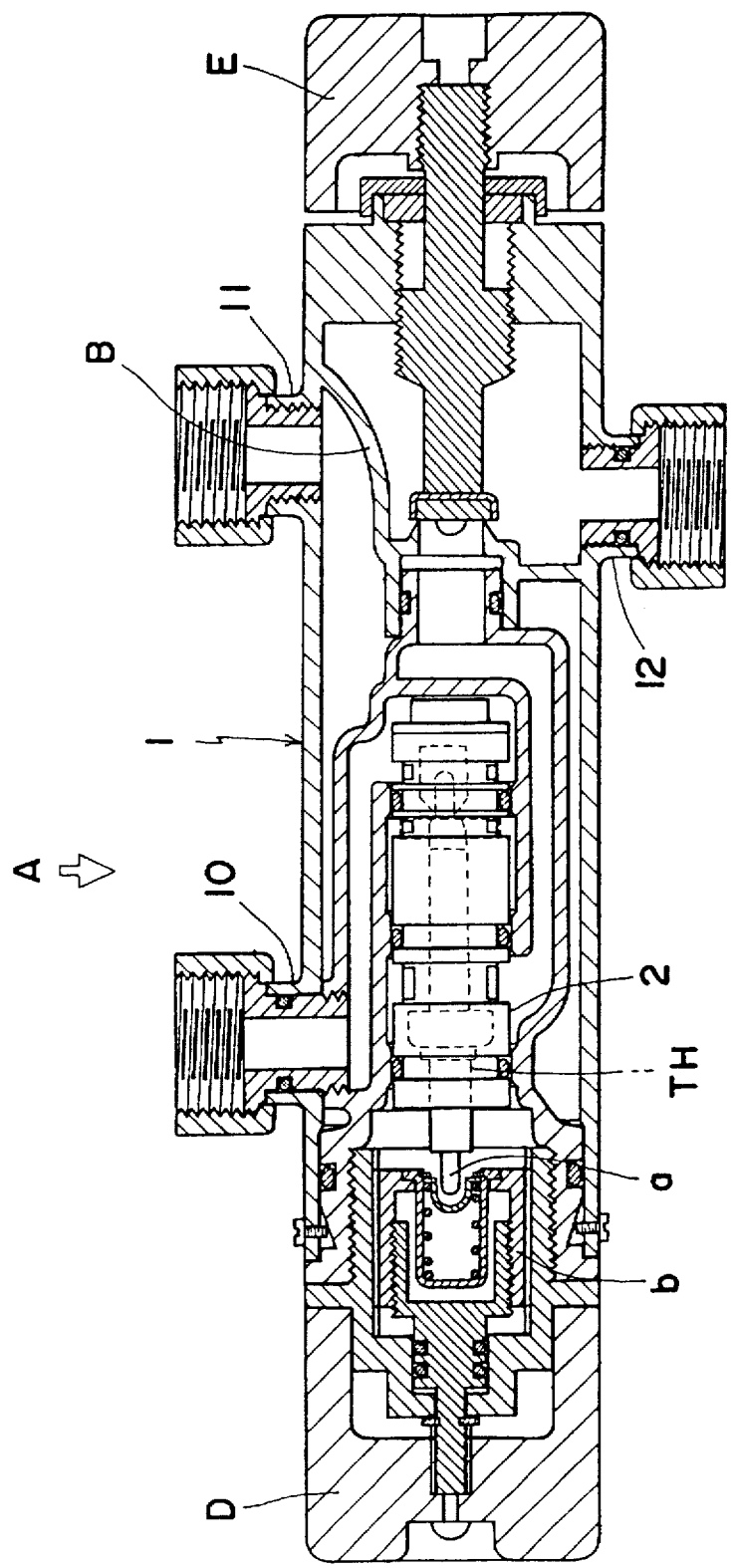
FIG. 3 is a longitudinal sectional front view showing an improved automatic water combination faucet having a temperature control dial incorporated with the left side and a stop handle incorporated with the right side.

In the drawings, the same reference numerals are used for constituent members having effects identical with those of conventional constituent members.

Figure 4:
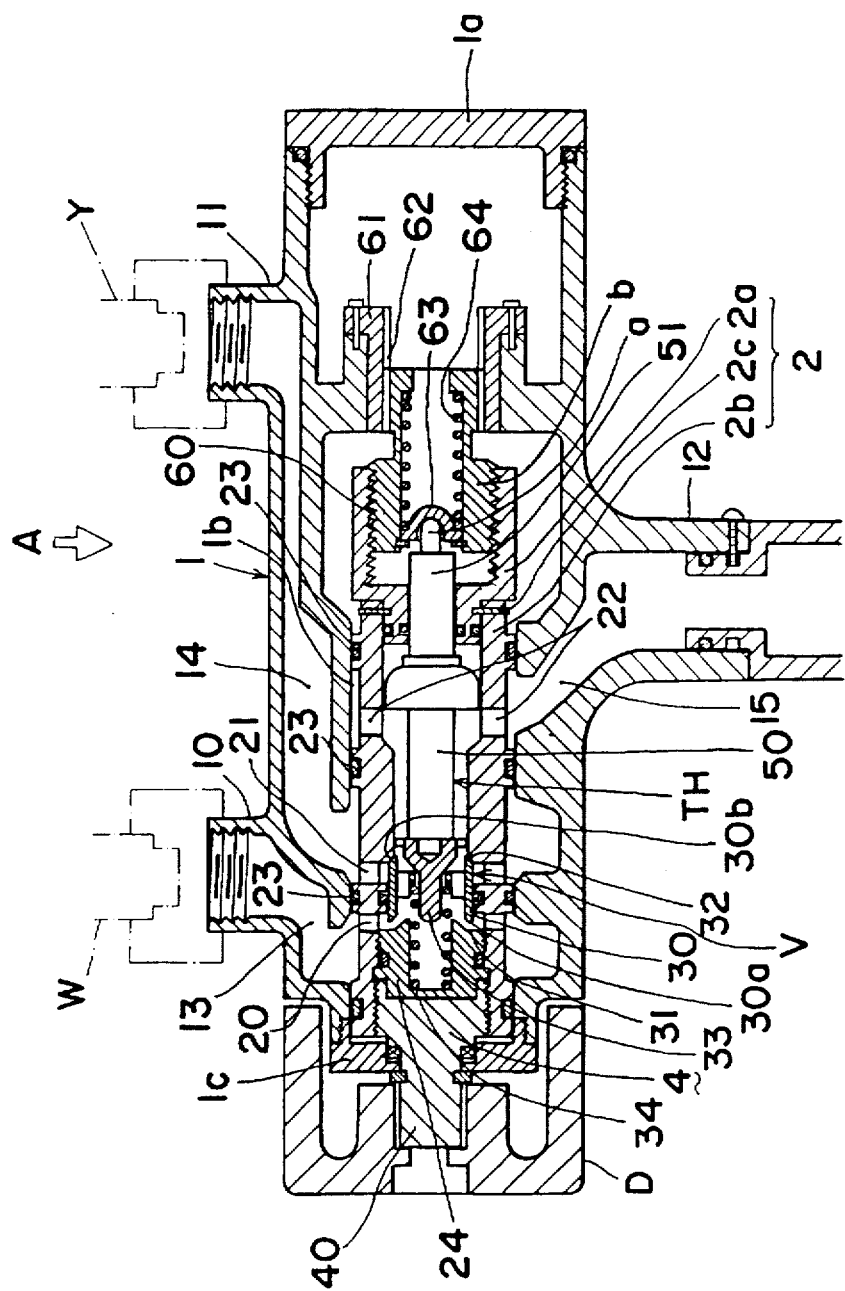
FIG. 4 is a longitudinal sectional front view showing an automatic water combination faucet according to the present invention.

FIG. 4 is a longitudinal sectional front view showing an automatic water combination faucet A having a temperature control dial D incorporated with the left side according to the present invention. In the drawings, reference numeral 1 means a body, 10 is a hot water inlet pipe provided on the left end side of the upper surface of the body 1, 11 is a water inlet pipe provided on the right end side of the upper surface of the body 1, 12 is a combination water outlet pipe provided on the bottom surface of the body 1, 2 is a cartridge inserted into the body 1, TH is a thermostat incorporated in the cartridge 2, V is a mixing valve mechanism automatically controlled by the actuation of the thermostat TH, b is an adjustment screw for displacing a position to support an operating rod a of the thermostat TH so as to vary a setting temperature, D is a temperature control dial provided on the left end of the body 1, and 1a is a lid member provided on the right end of the body 1.

The body 1 has the following structure similar to that of the prior art. Namely, the body 1 has a cylindrical shape and includes the hot water inlet pipe 10 provided in the form of a joint pipe on the left end of the upper surface of the body 1 and connected to a hot water supply line W, the water inlet pipe 11 provided in the form of a joint pipe on the right end of the upper surface of the body 1 and connected to a water supply line Y, and the combination water outlet pipe 12 provided in the form of a joint pipe on the bottom surface of the body 1 so as to discharge combination water. Further, the body 1 contains an inner cylinder portion 1b loaded with the cartridge 2 containing both the mixing valve mechanism V and the thermostat TH, a hot water passage 13 permitting the communication between a hot water inlet 20 provided in the cartridge 2 and the hot water inlet pipe 10, a water passage 14 permitting the communication between a water inlet 21 provided in the cartridge 2 and the water inlet pipe 11, and a combination water passage 15 permitting the communication between a combination water outlet 22 provided in the cartridge 2 and the combination water outlet pipe 12.

Further, the cartridge 2 incorporated in the body 1 has the following structure similar to that of the prior art. Namely, as shown in FIG. 4, the cartridge 2 has an axial cylinder shape and includes the hot water inlet 20 and the water inlet 21 respectively provided in the form of window holes in portions close to the left end of a peripheral wall of a core portion of the cartridge 2, the combination water outlet 22 provided in each of left and right intermediate portions of the peripheral wall of the core portion. Further, the cartridge 2 contains the mixing valve mechanism V positioned on the left end of the cartridge 2 and composed of a valve body 30 of a cylindrical valve shape and valve seats 31, 32 corresponding to the valve body 30 so as to control the rate of inflow of hot water and water respectively supplied from the hot water inlet 20 and the water inlet 21, the thermostat TH positioned at an intermediate portion of the cartridge 2 in such a state that the projected or retracted operating rod a of the thermostat is projected to the right to automatically control the mixing valve mechanism V, and the adjustment screw b incorporated with the right end of the cartridge 2 to support the projection end of the operating rod a. Further, in the above structure, the cartridge 2 is inserted into the inner cylinder portion 1b of the body 1 through water-tight members 23 such as to water-tightly partition the hot water inlet 20, the water inlet 21 and the combination water outlet 22 or the like to one another.

However, the cartridge 2 of the present invention is incorporated in the body 1 so as to be freely rotated relatively to the body 1 about a longitudinal axis of the cartridge.

Then, a valve seat member 24 of a cap shape is provided on the left end side of the cartridge 2 and has the valve seat 31 facing a hot water valve 30a of the valve body 30 of the mixing valve mechanism V. A mounting member 4 is incorporated with the outer surface of the valve seat member 24 so as to incorporate the temperature control dial D with the body. In this case, the mounting member 4 is connected integrally with the left end of the cartridge 2 by means of screwing. The mounting member 4 has a mounting shaft portion 40 provided on the outer end of the mounting member 4 and projected outward through an axial core portion of the lid member 1c incorporated with the left end of the body 1. The temperature control dial D is mounted on the mounting shaft portion 40 and rotated to thereby freely rotate the cartridge 2.

Further, the adjustment screw b is incorporated with the right end of the cartridge 2 such that the inner end side (i.e., the left end side in the drawing) of the adjustment screw b is fitted to the inner peripheral surface of the right end of the cartridge 2 through a screw 60 or a spline, and the outer end side thereof is fitted to the inner peripheral surface of a support member 61 provided in the body 1 through a spline 62 or a screw. By so doing, when the temperature control dial D is operated to rotate the cartridge 2, the adjustment screw b is displaced to the left or right relatively to the cartridge 2, and as a result, a support member 63 provided on the adjustment screw b to support the operating rod a is displaced to the left or right.

Further, in this embodiment, the cartridge 2 is composed of a cartridge body 2b, a portion 2a formed separately from the cartridge body 2b and having the screw 60 or spline brought into screw or spline engagement with the adjustment screw b to fit the portion 2a and the adjustment screw b to each other, and a connection pin 2c for connecting the portion 2a and the cartridge body 2b together as one body. Accordingly, the screw 60 or spline adapted to connect the cartridge 2 and the adjustment screw b together is formed with ease.

The thermostat TH has a therms sensor 50 of an axial cylinder shape and a guide cylinder portion 51 allowing the insertion of the operating rod a so as to freely project or retract the operating rod a from and into the guide cylinder portion, and wax or the like is enclosed in the therms sensor 50. Namely, the thermostat TH is of a wax thermo element, in which the operating rod a is projected from or retracted into the guide cylinder portion 51 due to a change of volume of the wax or the like depending on a temperature. The tip end of the operating rod a is brought into collision against the support member 63, and the outer end of the therms sensor 50 is connected to the valve body 30 of the mixing valve mechanism V through a connection member 33.

The mixing valve mechanism V has a cylindrical valve shape and is composed of the valve body 30 arranged in the cartridge 2 so as to extend over the inner surfaces of the hot water inlet 20 and the water inlet 21 respectively provided in the peripheral wall of the core portion of the cartridge 2, the hot water valve 30a formed on the left edge of the valve body 30, the valve seat 31 adapted for the hot water valve 30a and formed on the valve seat member 24 so as to face the hot water valve 30a, the water valve 30b formed on the right edge of the valve body 30, and the valve seat 32 adapted for the water valve 30b and formed on the inner surface of the peripheral wall of the core portion of the cartridge 2 so as to face the water valve 30b. The valve body 30 is biased by the action of a spring 34 so as to be pushed toward the thermostat TH.

Further, the support member 63 is pushed toward the operating rod a by the action of a spring 64 so as to support the operating rod a of the thermostat TH.

Therefore, according to the automatic water combination faucet A having the above structure, the thermostat TH is incorporated in the body 1 such that the projected or retracted operating rod a is directed to the right similarly to the conventional automatic water combination faucet. Further, the adjustment screw b is arranged on the right end side in the body 1. Accordingly, when the temperature control dial D incorporated with the left end of the body 1 is rotated to rotate the cartridge 2, the adjustment screw b is displaced in the direction of projection or retraction of the operating rod a, and as a result, the setting temperature is variably controlled as desired.

Figure 5:
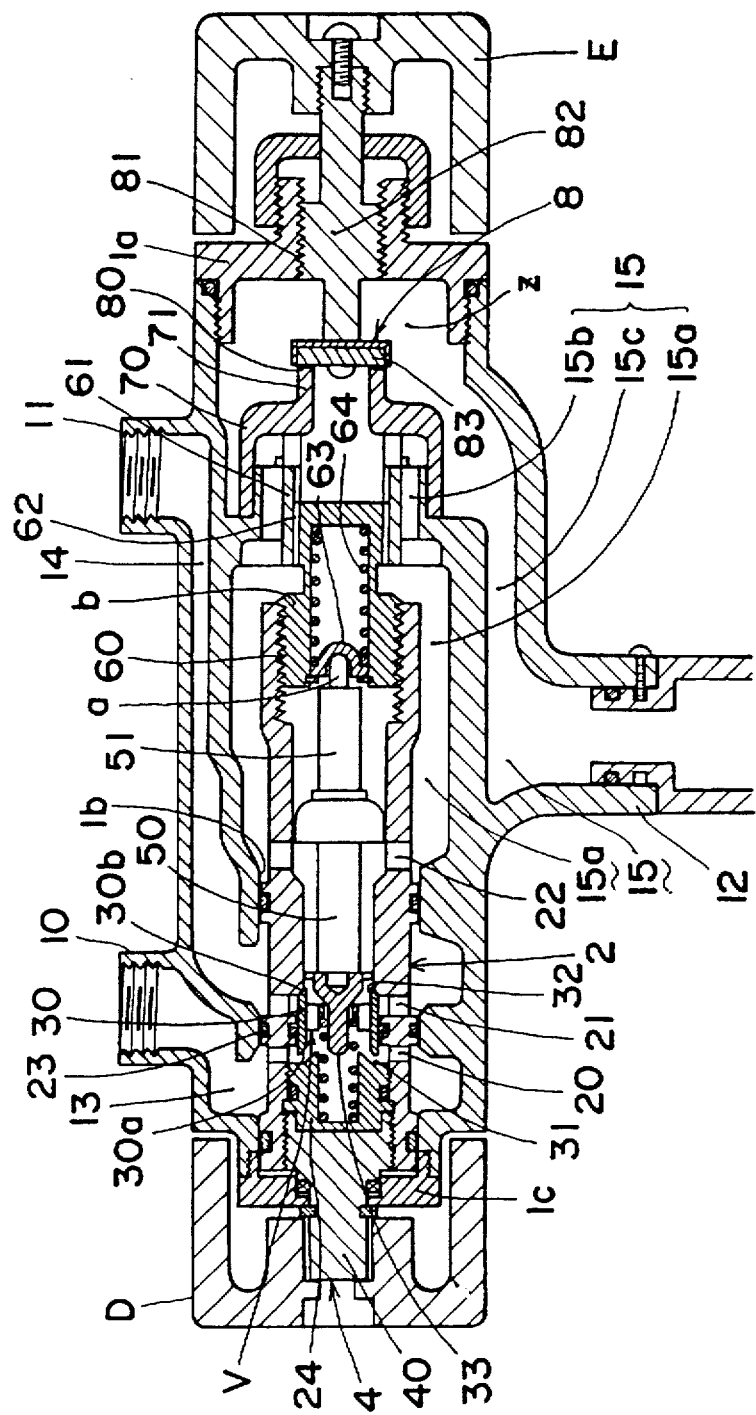
FIG. 5 is a longitudinal sectional front view showing an automatic water combination faucet as an embodiment having a temperature control dial incorporated with the left side and a stop handle incorporated with the right side according to the present invention.

FIG. 5 shows another embodiment of the present invention. The embodiment shown in FIG. 5 further comprises a stop handle E incorporated with the right end of the body 1 of the automatic water combination faucet A having the temperature control dial provided on the left side of the body as shown in FIG. 4.

The embodiment of FIG. 5 has the structure basically similar to that of the embodiment shown in FIG. 4 except that the combination water passage 15 defined inside the body 1 is modified, and the lid member 1a provided on the right end of the body 1 is also modified.

The body 1 of the embodiment shown in FIG. 5 has the following structure basically similar to that of the embodiment shown in FIG. 4. Namely, the body 1 has the hot water inlet pipe 10 provided on the left end of the peripheral wall of the core portion of the body 1, the water inlet pipe 11 provided on the right end of the peripheral wall of the core portion of the body 1, and the combination water outlet pipe 12 provided at an intermediate portion of the body 1. Further, the body 1 contains the inner cylinder portion 1b loaded with the cartridge 2 containing both the mixing valve mechanism V and the thermostat TH, the hot water passage 13 communicating with the hot water inlet 20 provided in the cartridge 2 incorporated in the body 1, the water passage 14 communicating with the water inlet 21 provided in the cartridge, and the combination water passage 15 communicating with the combination water outlet 22 provided in the cartridge. Further, the body 1 also contains the adjustment screw b incorporated with the inner right end of the body 1 so as to support the tip end of the operating rod a of the thermostat TH.

However, the combination water passage 15 of the embodiment shown in FIG. 5 is composed of a passage 15a defined around the right end of the cartridge 2, a passage 15b of a water through hole shape defined around the support member 61 mounted with the adjustment screw b, and a passage 15c. The combination water passage 15 leads combination water from the combination water outlet 22 of the cartridge to the combination water outlet pipe 12 provided on the bottom surface of the intermediate portion of the body 1 through a hollow space z defined in front of the lid member 1a incorporated with the right end side in the body 1. Namely, the combination water passage 15 leads combination water to the hollow space z through the passages 15a and 15b, and subsequently from the hollow space z backward to the combination water outlet pipe 12 through the passage 15c.

Further, a water guide cap 70 of a funnel shape is connected to the right end of the support member 61 which supports the adjustment screw b. The water guide cap 70 collects the combination water having passed through the passage 15b of the water through hole shape. Furthermore, the water guide cap 70 has a cylindrical portion 71 of a nipple shape having an open end arranged at an axial core portion of the hollow space z. A valve seat 80 of a stop valve mechanism 8 is formed on the open edge of the cylindrical portion 71.

The lid member 1a mounted on the right end of the body 1 has a tapped hole 81 bored in the axial core portion of the lid member 1a, and an internal thread is provided on the inner surface of the tapped hole. A valve shaft 82 of the stop valve mechanism 8 is connected to the tapped hole 81 by means of screwing. A valve 83 is provided on the inner end of the valve shaft 82 so as to face the valve seat 80, which is adapted for the stop valve and provided on the open edge of the cylindrical portion 71. Further, the stop handle E adapted for the stop valve is incorporated with the outer end of the valve shaft 82.

According to the embodiment shown in FIG. 5, the stop valve mechanism 8 has the following simple structure. Namely, the stop mechanism 8 is incorporated in the hollow space z defined on the right end side in the body 1, and the valve shaft 82 of the stop valve mechanism 8 is incorporated with the lid member 1a on the right end of the body 1.

What is claimed is:

1. An automatic water combination faucet, comprising:
 a body having a hot water inlet pipe, a water inlet pipe and a combination water outlet pipe respectively provided on the outer surface;
 a mixing valve mechanism incorporated in said body to control the rate of inflow of hot water and water respectively supplied from said hot water inlet pipe and said water inlet pipe; and
 a thermostat incorporated in said body to automatically control said mixing valve mechanism so as to hold a desired setting temperature of combination water discharged from said combination water outlet pipe;
 wherein said mixing valve mechanism and said thermostat respectively incorporated in said body are housed in a cartridge of an axial cylinder shape;

said cartridge is inserted into said body so as to be freely rotated about a rotary axis in the longitudinal axial direction;

an adjustment screw is provided on one end side in said body, adjacent to a projected or retracted operating rod of the thermostat in said cartridge so as to be freely displaced in the axial direction of said body to support said operating rod;

said adjustment screw and one end of said cartridge are respectively connected to said body through a screw and a spline such that said adjustment screw is displaced in the axial direction of said body through the rotation of said cartridge; and said cartridge is connected to a temperature control dial provided on the other end of said body so as to be rotated by the operation of rotating said temperature control dial.

2. An automatic water combination faucet, comprising:

a body having a hot water inlet pipe provided at a position close to the left of said body and connected to a hot water supply line, a water inlet pipe provided at a position close to the right of said body and connected to a water supply line, and a combination water outlet pipe provided at a desired position of said body;

a cartridge containing a mixing valve mechanism and a thermostat and incorporated in said body so as to be freely rotated about a longitudinal axis of the cartridge in such a state that an operating rod of the thermostat is positioned on the right end;

a temperature control dial incorporated with the left end of said body and connected to said cartridge such that said cartridge is rotated by the operation of rotating said dial; and an adjustment screw arranged on the right end side in said body and connected to said cartridge such that said adjustment screw is displaced in the direction of projection or retraction of the operating rod of said thermostat through the rotation of said cartridge to support said operating rod.

3. An automatic water combination faucet according to claim 1, wherein a combination water passage is defined to permit the communication between the combination water outlet pipe and the combination water outlet provided in the cartridge inserted into said body such that said passage leads combination water from said combination water outlet to the combination water outlet pipe through a hollow space defined on the right end side in said body, a portion of said passage is on-off controlled by a stop valve mechanism arranged in said hollow space, a stop handle is mounted on the right end of said body to operate the stop valve mechanism, and a passage portion is defined around a support member, which supports said adjustment screw, to permit the communication between the combination water outlet provided in the cartridge and the hollow space.

* * * * *